United States Patent
Defossé

(12) 
(10) Patent No.: US 7,010,594 B2
(45) Date of Patent: Mar. 7, 2006

(54) SYSTEM USING ENVIRONMENTAL SENSOR AND INTELLIGENT MANAGEMENT AND CONTROL TRANSCEIVER FOR MONITORING AND CONTROLLING REMOTE COMPUTING RESOURCES

(75) Inventor: Erin M. Defossé, Austin, TX (US)

(73) Assignee: Isochron, LLC, Austin, TX (US)

( * ) Notice: Subject to any disclaimer, the term of this patent is extended or adjusted under 35 U.S.C. 154(b) by 721 days.

(21) Appl. No.: 09/862,891

(22) Filed: May 22, 2001

(65) Prior Publication Data

US 2001/0047410 A1    Nov. 29, 2001

Related U.S. Application Data

(60) Provisional application No. 60/207,581, filed on May 26, 2000.

(51) Int. Cl.
   *G06F 15/173* (2006.01)
(52) U.S. Cl. .......................... 709/224; 710/15
(58) Field of Classification Search ............... 709/224, 709/223, 203; 340/540; 455/553; 710/15; 370/334

See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A | 10/1983 | Sedam et al. | 364/479 |
| 4,454,670 A | 6/1984 | Bachmann et al. | 40/584 |
| 4,553,211 A | 11/1985 | Kawasaki et al. | 364/479 |
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |
| 4,926,996 A | 5/1990 | Eglise et al. | 194/212 |
| 4,954,697 A | 9/1990 | Kokubun et al. | 235/381 |

(Continued)

FOREIGN PATENT DOCUMENTS

DE    41 40 450 A1    6/1993

(Continued)

OTHER PUBLICATIONS

International Search Report PCT/US 03/37776, Mailed May 17, 2004.

(Continued)

*Primary Examiner*—Le Hien Luu
(74) *Attorney, Agent, or Firm*—Baker Botts L.L.P.

(57) ABSTRACT

The present disclosure provides a system and apparatus for the remote monitoring and control of a computing component. An intelligent management and control transceiver (IMCT) is preferably attached to a computing component to be monitored and controlled. The IMCT preferably operates independently of the computing component being monitored and controlled by maintaining its own processing power, memory, power supply and communications capabilities. Software executing on the IMCT enables various functional and environmental characteristics of the computing component to be monitored and controlled. A wireless transceiver is preferably included to allow the IMCT to generate an alert in response to the occurrence of a monitored event as well as to enable the remote management of the computing component. In addition, an Internet web site, portable wireless device or interface to existing computing component management software may be provided and used to access the computing component being monitored as well as to control the computing component preferably using the IMCT.

22 Claims, 1 Drawing Sheet

U.S. PATENT DOCUMENTS

| | | | |
|---|---|---|---|
| 5,029,098 A | 7/1991 | Lavasseur | 364/479 |
| 5,077,582 A | 12/1991 | Kravette et al. | 355/206 |
| 5,090,589 A | 2/1992 | Brandes et al. | 221/2 |
| 5,091,713 A | 2/1992 | Horne et al. | 340/541 |
| 5,117,407 A | 5/1992 | Vogel | 369/30 |
| 5,184,179 A | 2/1993 | Tarr et al. | 355/206 |
| 5,207,784 A | 5/1993 | Schwartzendruber | 221/6 |
| 5,239,480 A | 8/1993 | Huegel | 364/479 |
| 5,255,819 A | 10/1993 | Peckels | 222/1 |
| 5,282,127 A | 1/1994 | Mii | 364/479 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A * | 7/1997 | Andrews | 370/334 |
| 5,671,362 A | 9/1997 | Cowe et al. | 395/228 |
| 5,701,252 A | 12/1997 | Facchin et al. | 364/479 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,794,144 A | 8/1998 | Comer et al. | 455/426 |
| 5,805,997 A | 9/1998 | Farris | |
| 5,815,652 A | 9/1998 | Ote et al. | 395/183.07 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | 380/23 |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | |
| 5,867,688 A | 2/1999 | Simmon et al. | 395/500 |
| 5,892,758 A | 4/1999 | Argyoudis | |
| 5,898,904 A | 4/1999 | Wang | 455/31.3 |
| 5,905,442 A | 5/1999 | Mosebrook et al. | |
| 5,905,882 A | 5/1999 | Sakagami et al. | |
| 5,907,491 A | 5/1999 | Canada et al. | 364/468.15 |
| 5,909,183 A | 6/1999 | Borgstahl et al. | 340/825.22 |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | |
| 5,956,487 A | 9/1999 | Venkatraman et al. | |
| 5,957,262 A | 9/1999 | Molbak et al. | 194/200 |
| 5,959,536 A | 9/1999 | Chambers et al. | |
| 5,959,869 A | 9/1999 | Miller et al. | 364/479.1 |
| 5,979,757 A | 11/1999 | Tracy et al. | 235/383 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | |
| 6,021,437 A | 2/2000 | Chen et al. | 709/224 |
| 6,029,143 A | 2/2000 | Mosher et al. | 705/28 |
| 6,032,202 A | 2/2000 | Lea et al. | |
| 6,038,491 A | 3/2000 | McGarry et al. | 700/231 |
| 6,052,667 A | 4/2000 | Walker et al. | 705/15 |
| 6,052,750 A | 4/2000 | Lea | 710/72 |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A | 5/2000 | Myers et al. | 292/201 |
| 6,070,070 A | 5/2000 | Ladue | 455/419 |
| 6,072,521 A | 6/2000 | Harrison et al. | 348/12 |
| 6,084,528 A | 7/2000 | Beach et al. | 340/825.35 |
| 6,085,888 A | 7/2000 | Tedesco et al. | 194/217 |
| 6,119,100 A | 9/2000 | Walker et al. | 705/20 |
| 6,124,800 A | 9/2000 | Beard et al. | 340/825.35 |
| 6,131,399 A | 10/2000 | Hall | 62/127 |
| 6,161,059 A | 12/2000 | Tedesco et al. | 700/232 |
| 6,163,811 A | 12/2000 | Porter | 709/247 |
| 6,181,981 B1 | 1/2001 | Varga et al. | 700/236 |
| 6,185,545 B1 | 2/2001 | Resnick et al. | 705/40 |
| 6,199,753 B1 | 3/2001 | Tracy et al. | 235/375 |
| 6,230,150 B1 | 5/2001 | Walker et al. | |
| 6,272,395 B1 | 8/2001 | Brodbeck | 700/236 |
| 6,289,453 B1 | 9/2001 | Walker et al. | 713/175 |
| 6,304,895 B1 * | 10/2001 | Schneider et al. | 709/203 |
| 6,324,520 B1 | 11/2001 | Walker et al. | 705/16 |
| 6,338,149 B1 | 1/2002 | Ciccone, Jr. et al. | 714/38 |
| 6,339,731 B1 | 1/2002 | Morris et al. | 700/236 |
| 6,341,271 B1 | 1/2002 | Salvo et al. | 705/28 |
| 6,356,794 B1 | 3/2002 | Perin, Jr. et al. | 700/78 |
| 6,385,772 B1 | 5/2002 | Courtney | 725/105 |
| 6,437,692 B1 * | 8/2002 | Petite et al. | 340/540 |
| 6,442,532 B1 | 8/2002 | Kawan | 705/35 |
| 6,457,038 B1 | 9/2002 | Defosse | 709/200 |
| 6,462,644 B1 | 10/2002 | Howell et al. | 340/5.92 |
| 6,467,685 B1 | 10/2002 | Teicher | 235/379 |
| 6,502,131 B1 * | 12/2002 | Vaid et al. | 709/224 |
| 6,505,095 B1 | 1/2003 | Kolls | 700/244 |
| 6,525,644 B1 | 2/2003 | Stillwagon | 340/5.61 |
| 6,550,672 B1 | 4/2003 | Tracy et al. | 235/383 |
| 6,553,336 B1 | 4/2003 | Johnson et al. | 702/188 |
| 6,581,986 B1 | 6/2003 | Roatis et al. | 292/199 |
| 6,584,309 B1 | 6/2003 | Whigham | 455/414 |
| 6,604,086 B1 | 8/2003 | Kolls | 705/14 |
| 6,604,087 B1 | 8/2003 | Kolls | 705/14 |
| 6,606,602 B1 | 8/2003 | Kolls | 705/14 |
| 6,606,605 B1 | 8/2003 | Kolls | 705/26 |
| 6,609,113 B1 | 8/2003 | O'Leary et al. | 705/39 |
| 6,704,714 B1 | 3/2004 | O'Leary et al. | 705/39 |
| 6,712,266 B1 | 3/2004 | Bartley et al. | 235/380 |
| 6,714,977 B1 * | 3/2004 | Fowler et al. | 709/224 |
| 6,738,811 B1 * | 5/2004 | Liang | 709/224 |
| 6,748,296 B1 | 6/2004 | Banerjee et al. | 700/241 |
| 6,772,048 B1 | 8/2004 | Leibu et al. | 700/241 |
| 6,837,436 B1 | 1/2005 | Swartz et al. | 235/472.02 |
| 6,867,685 B1 | 3/2005 | Stillwagon | 340/5.64 |
| 6,900,720 B1 | 5/2005 | Denison et al. | 340/5.9 |
| 2001/0002210 A1 | 5/2001 | Petite | 379/155 |
| 2001/0042121 A1 | 11/2001 | Defosse et al. | |
| 2002/0024420 A1 | 2/2002 | Ayala et al. | 340/5.61 |
| 2002/0169539 A1 | 11/2002 | Menard et al. | 701/200 |
| 2003/0013482 A1 * | 1/2003 | Brankovic | 455/553 |
| 2003/0128101 A1 | 7/2003 | Long | 340/5.26 |
| 2004/0207509 A1 | 10/2004 | Mlynarczyk et al. | 340/5.23 |
| 2005/0161953 A1 | 7/2005 | Roatis et al. | 292/199 |
| 2005/0179544 A1 | 8/2005 | Sutton et al. | 340/543 |

FOREIGN PATENT DOCUMENTS

| | | |
|---|---|---|
| EP | 0 564 736 A1 | 10/1993 |
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 744 545 | 2/1996 |

| | | |
|---|---|---|
| FR | 2 755776 | 5/1998 |
| JP | 6296335 A2 | 10/1994 |
| JP | 9198172 A2 | 7/1997 |
| JP | 10105802 | 4/1998 |
| JP | 04253294 | 9/2002 |
| WO | WO 89/07807 | 8/1989 |
| WO | WO 95/04333 | 2/1995 |
| WO | WO 95/05609 | 2/1995 |
| WO | WO 97/09667 | 3/1997 |
| WO | WO 99/23620 | 11/1997 |
| WO | WO 98/455779 | 10/1998 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | 02/19281 | 3/2002 |

OTHER PUBLICATIONS

International Preliminary Examination Report PCT/US01/31381, Mailed May 12, 2003.
International Search Report PCT/US01/16749, Mailed Dec. 20, 2001.
International Search Report PCT/US 01/31381, Mailed Nov. 7, 2002.
Pending U.S. Appl. No. 09/853,366, entitled *Method and System for the Optimal Formatting, Reduction and Compression of DEX/UCS Data* filed May 11, 2001 by Defosse et al., May 11, 2001.
"Meet the Smart Coke Machine," The Sacramento Bee Business Technology, Aug. 30, 1995.
"Coke Machine Signal when it's Time for a Refill", The Globe & Mall, Toranto, Ontario, Aug. 30, 1995.
Wireless Communications Forum, CTIA, vol. III, No. 1, Apr. 1995.
Pate, Kelly, "Skywire Allows Vendor Tracking of Pop Stock and Sales Details", *RCR*, vol. 14, No. 17, Sep. 4, 1995.
"Skywire Provides Details of Wireless 'VendView' System", *VendingTimes*, Sep. 1994.
"Left High and Dry? Sold-out Machine Sends for Cokes", *Nashville Banner*, Aug. 16, 1995.
International Search Report for PCT/US99/05983, Aug. 13, 1999.
U.S. Pending Appl. No. 09/267,254 entitled *"Remote Data Acqusition and Transmission System and Method"* filed by Erin M. Defossé, filed Mar. 12, 1999.
NetBotz Internet Arrticle, "Welcome to Netbotz" at internet <http:www.netbotz.com>, Printed May 10, 2000.
American Power Conversion Internet Article, "Lightning Advisor", at internet,<http://lightning.apcc.com>, Printed May 10, 2000.
American Products Internet Article, "Product Information", at internet, <http://www.apc.com>, Printed May 10, 2000.
PCT Search Report PCT/US 01/41640, Mailed Aug. 21, 2002.
PCT Search Report PCT/US01/16749, Mailed Dec. 20, 2001.
International Search Report PCT US 01/41640, Mailed Aug. 21, 2002.
International Search Report PCT/US01/15522, Mailed May 16, 2002.
Antronics Ltd Case Study—BT redcare Telemetry Vending Interface Unit (pp. 1-4).

* cited by examiner

SYSTEM USING ENVIRONMENTAL SENSOR AND INTELLIGENT MANAGEMENT AND CONTROL TRANSCEIVER FOR MONITORING AND CONTROLLING REMOTE COMPUTING RESOURCES

CROSS REFERENCE TO RELATED APPLICATION

This application claims priority from U.S. Provisional Patent Application Ser. No. 60/207,581, filed May 26, 2000, and entitled "SYSTEM AND APPARATUS FOR THE REMOTE MONITORING AND CONTROL OF A COMPUTING COMPONENT."

TECHNICAL FIELD

The present invention relates generally to computing component monitoring and control. More particularly, the present invention relates to a system and apparatus for the remote monitoring and control of a computing component using wireless technology.

BACKGROUND

As with many other aspects of modern day life, computer systems have assumed a significant role in almost every business. Today, it is extremely rare to find a person or organization that is not significantly dependent upon computer applications. Often, work can come to a complete standstill when critical applications become unavailable.

IT (information technology) personnel are generally responsible for delivering application functionality to end users. As such, IT personnel may rely upon a collection of hardware and software, of networks, systems, and databases to ensure this availability. Many IT personnel are responsible for both creating the infrastructure required by the applications, as well as for ensuring that the applications are available and properly functioning when needed.

In today's economy, an IT organization can easily spend large amounts of money buying the latest technology in an attempt to ensure delivery of services to its clients. However, such measures are often inadequate. In order to be able to consistently deliver applications and services to clients, an IT organization may also need a management infrastructure to monitor and control underlying applications and hardware. Without such a management infrastructure, it is generally not possible to ensure twenty-four hours per day/seven days per week (24/7) availability and performance of important applications.

A management infrastructure generally consists of those components that may be used by IT personnel to ensure the delivery of services to its clients. Such an infrastructure might include hardware, software and human components. While there are many facets to ensuring availability, one of the most important is real time monitoring and control of networks, systems, applications, and databases such that problems may be detected, anticipated and, in some cases, corrected.

Effective real time monitoring generally requires that the IT organization have a set of management tools designed to support this part of the IT function. Efficient monitoring and control may be best implemented using tools to automate some of the processes.

In many situations, it is essential to incorporate tools as part of the management processes for two primary reasons. First, tools generally provide a lower cost of monitoring large numbers of components, i.e., networks, systems, applications and databases. For example, some management systems are capable of monitoring hundreds of objects or components. To manually manage the same complex combination of hardware and software distributed over multiple locations would generally require a large staff. Such a staff would be necessary to perform the constant monitoring of the components and would be in addition to the staff required to resolve any detected problems.

Another major advantage offered by management tools with regard to monitoring is that it is generally possible to detect and resolve problems more quickly. An automated solution is often able to detect problems within seconds of occurrence. A human operator will generally take much more time to manually perform the same or similar functions necessary to detect a problem.

While monitoring managed environments is key, various aspects of controlling the environment, including problem resolution, are equally important. Management tools lead to shorter times for problem resolution often at a lower cost. As such, without a set of management tools to automate the processes of detecting and correcting problems, IT personnel would be faced with a virtually impossible task. Without the aid of monitoring and controlling systems, an IT organization is often forced to provide a lower level of service at a significantly higher cost.

SUMMARY OF THE INVENTION

In accordance with teachings of the present disclosure, a system and apparatus are described for remotely monitoring and controlling a computing component. In one aspect of the present invention, an apparatus for the remote monitoring and control of a computing component is provided. The apparatus preferably includes at least one processor and at least one memory operably coupled to the processor. A communications interface that is preferably operable to receive information from and transmit information to the computing component is also preferably coupled with the processor and the memory. A transceiver operable to transmit information to and receive information from a communications network is preferably included and operably coupled to the processor and the memory. The apparatus further preferably includes at least one program of instructions storable in the memory and executable by the processor. The program of instructions is preferably operable to monitor at least one characteristic of the computing component and to control at least one function of the computing component.

In another aspect of the present invention, a system for remotely managing a large number of computing components is provided. The system preferably includes an intelligent transceiver operably coupled to the computing components through a communications interface. The intelligent transceiver preferably includes at least one processor operably coupled to a memory and a transceiver. The transceiver is preferably operable to transmit information to and receive information from a network. An operating system storable in the memory and executable by the processor may also be included in the intelligent transceiver. The operating system preferably includes at least one instruction operable to communicate via the network, at least one instruction operable to monitor and control at least one facet of the computing components and at least one instruction operable to enable the remote management of the computing components. A local agent storable in a memory and executable in a processor of the computing components is also preferably included and operable to communicate one or more characteristics of the at least facet to the operating system.

One technical advantage provided by the present invention is the ability, independent of a monitored computing component's operability or the operability of a primary network, to generate an alert in response to the occurrence of a monitored event.

Another technical advantage provided by the present invention, is the ability to manage a monitored computing component from a remote device such as a two-way pager, mobile phone, PDA (personal digital assistant), computer or similar device.

Yet another technical advantage provided by the present invention, is the ability to increase availability and minimize downtime of computing resources through the real-time notification of the occurrence of monitored events.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
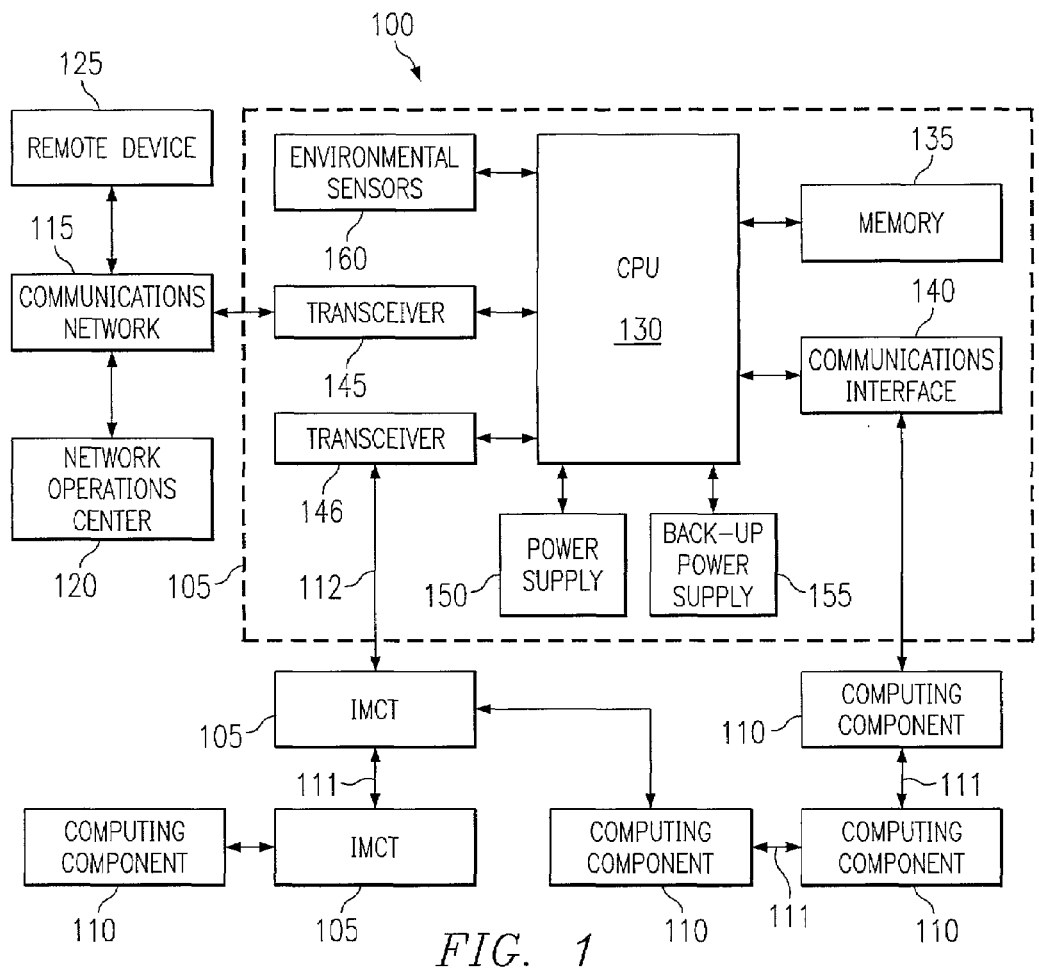
FIG. 1 is a schematic drawing showing one embodiment of a hardware system incorporating teachings of the present invention.
Figure 2:
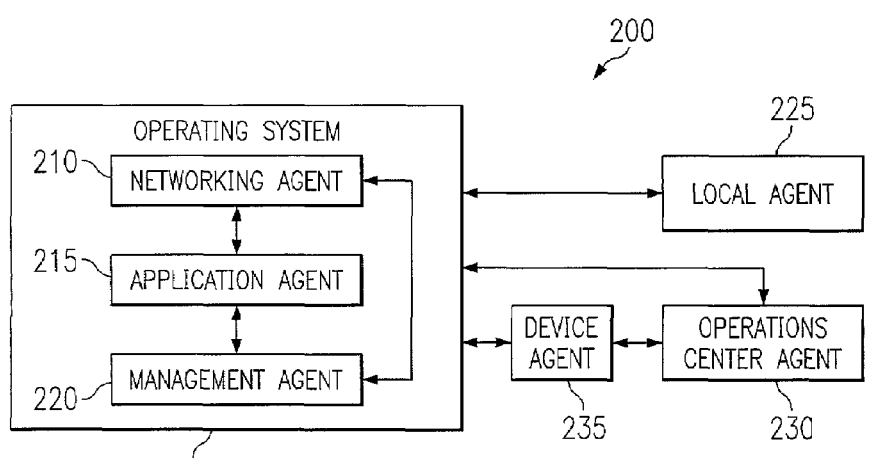
FIG. 2 is a schematic drawing showing one embodiment of a software system incorporating teachings of the present invention.

Preferred embodiments of the invention and its advantages are best understood by referring to FIGS. 1–2 of the drawings, like numerals being used for like and corresponding parts of the various drawings.

Referring first to FIG. 1, a schematic drawing showing a hardware system incorporating teachings of the present invention is illustrated. System 100 of FIG. 1 depicts intelligent management and control transceiver (IMCT) 105 preferably coupled to computing components 110. As illustrated, IMCT 105 may communicate with any of a plurality of computing components 110 coupled via wireless or wire-line network 111 (LAN or WAN). Similarly, a plurality of IMCTs 105 may communicate via wireless or wire-line LAN 112. Communications network 115 is preferably coupled to IMCT 105 such that IMCT 105 and communications network 115 may exchange information via a wireless or wire-line communications medium (not expressly shown). Network operations center (NOC) 120 and remote device 125 are also shown preferably coupled to communications network 115.

In a preferred embodiment, IMCT 105 is capable of storing and executing its own application software, i.e., without requiring an external central processing unit (CPU) or external memory. Accordingly, IMCT 105 preferably includes CPU 130 and memory 135 operable to respectively execute and store application software incorporating teachings of the present invention.

Communications interface 140 is preferably included in IMCT 105 and is operably coupled to CPU 130 and memory 135. Communications interface 140 enables IMCT 105 to monitor and control computing component 110 by enabling IMCT 105 to communicate or exchange information with a CPU and software (not expressly shown) included in computing component 110. Communications interface 140 may be configured with any of a variety of communications protocols to effect communications between IMCT 105 and computing component 110. Examples of such communications interfaces include, but are not limited to, RS-232, Universal Serial Bus (USB), serial and IEEE 1394 or "Fire Wire," and Ethernet.

Transceiver 145, operably coupled to CPU 130 and memory 135, is also preferably included in the hardware configuration of IMCT 105 illustrated in FIG. 1. Transceiver 145 is preferably included in the hardware configuration of IMCT 105 to enable IMCT 105 to receive and transmit information from communications network 115 independent of computing component 110. Transceiver 145 also preferably allows IMCT 105 to communicate with remote device 125, NOC 120 as well as other IMCTs 105 either via communications network 115 or wireless or wire-line network 112. Communications network 115 and transceiver 145 may be implemented using wireless technology, wire-line technology as well as any other communications technology according to teachings of the present invention. In one embodiment, ReFLEX25 and ReFLEX50 by Motorola may be used as a wireless technology solution.

In a further embodiment of IMCT 105, LAN transceiver 146 may be preferably coupled to CPU 130. LAN transceiver 146 preferably allows an IMCT 105 to communicate with one or more other IMCTs 105. Such communication may be performed via wireless or wire-line network 111, 112 or communications network 115. LAN transceiver 146 may be implemented using a variety of wireless or wire-line technologies. Examples of such wireless and wire-line technologies include, but are not limited to, electrical power lines, electrical power distribution systems, building electrical wiring, conventional telephone lines, Ethernet cabling (10baseT, 100baseT, etc.), coaxial cables, radio frequencies, such as the 800 MHz, 900 MHz, 1.9 GHz and 2.4 GHz bands, as well as infra-red and laser.

Power may be supplied to the components of IMCT 105 via a power supply 150 that may be included in a preferred hardware configuration of IMCT 105. Back-up power supply 155 may also be included in IMCT 105 in the event power supply 150 fails to operate. As such, back-up power supply 155 further enables IMCT 105 to function independent of computing component's 110 operability.

One or more environmental sensors 160 may also be preferably included in IMCT 105. Environmental sensors 160 may be preferably coupled to CPU 130 and are preferably operable to monitor and test one or more environmental characteristics of IMCT 105 or computing component 110. Such environmental characteristics may include, but are not limited to, humidity and temperature.

As mentioned above, communications network 115 can be implemented using a variety of technologies according to teachings of the present invention. Communications network 115 can be a wire-line network such as POTS (Plain Old Telephone System) or a wireless network such as cellular, PCS (personal communications service), two-way paging (ReFLEX25, ReFLEX50, etc.), etc. According to teachings of the present invention, communications network 115 is preferably robust and, in corresponding situations, more robust than the communications technology that may be employed by computing component 110. Essentially, communication network 115 preferably exhibits failure modes that are not correlated with the performance of the communication technology employed by the computing component 110.

Communications network 115 is generally employed by the present invention as the medium by which information is communicated to and from IMCT 105, as well as to and from remote device 125 and NOC 120. According to teachings of the present invention, remote device 125 may be any of a plurality of devices. For example, remote device 125 may be a mobile phone, two-way pager, personal digital assistant (PDA), computer, etc. Preferably, remote device 125 is capable of both receiving information sent by IMCT 105 and its associated transceiver 145 as well as sending information to IMCT 105 and transceiver 145. Similarly, remote device 125 is preferably able to achieve two-way communication with network operations center 120 generally via communications network 115.

Network operations center 120 may be implemented using a variety of technologies according to teachings of the present invention. As depicted in FIG. 1, NOC 120 is preferably operable to receive and transmit communications or information via communications network 115. Information that may be communicated to NOC 120 may include, but is not limited to, event alerts transmitted by transceiver 145 of IMCT 105 or control instructions transmitted by remote device 125. Alternatively, NOC 120 may transmit control signals or instructions to transceiver 145 of IMCT 105 to initiate testing of computing component 110 or otherwise manage and control computing component 110. In addition, NOC 120 may also be employed to transmit information regarding the state of IMCT 105 or computing component 110 to remote device 125 or to any other desired destination or device.

In a further embodiment, IMCT 105 may be employed to monitor and control a large number of computing components 110. In such an implementation, IMCT 105 may be preferably coupled to one or more computing components 110 and is preferably operable to communicate with the remaining computing components 110 to which IMCT 105 is not directly connected such that desired monitoring and control functions may be effected on any of the plurality of computing components 110. One method for enabling IMCT 105 to communicate with a plurality of computing components 110 may be to preferably couple the plurality of computing components 110 via wireless or wire-line network 111. Further, the plurality of computing components 110 may be similar or different in design and function. Similarly, each computing component 110 in such an implementation may have its own IMCT 105 preferably coupled thereto. Each IMCT 105 may then be operable to communicate with one or more IMCTs 105 via LAN transceiver 146, communications network 115, network 111, network 112 as well as by other networks and communications interfaces.

Preferably driving many of the hardware components depicted in FIG. 1, are the software modules of the software system depicted in FIG. 2. Accordingly, FIG. 2 is a schematic drawing showing one embodiment of a software system 200 incorporating teachings of the present invention. Software system 200 preferably includes operating system 205 residing and executing on IMCT 105. Operating system 205 preferably includes networking agent 210 running thereon. Networking agent 210 is preferably operable to perform and control the communication functions preferred by IMCT 105 over communications network 115.

Application agent 215 is also preferably running on operating system 205. In one embodiment, application agent 215 performs the specific tasks associated with the monitoring and control of computing component 110. For example, application agent 215 may be enabled to instruct computing component 110 to test the integrity of its network connection, to check for updated files, to notify NOC 120 or remote device 125 in the event of an attempted security break, to determine the CPU temperature of computing component 110, to determine the ambient temperature of the environment of computing component 110, to access measurements taken by environmental sensor 160 as well as to monitor and control other characteristics associated with computing component 110. Application agent 215 may interface or communicate with a local agent 225 that is preferably included as a part of or as software in addition to an operating system residing on computing component 110 using a variety of protocols. Examples of such protocols include, but are not limited to, Windows NT SNMP API, UNIX SNMP API, Winsock, UNIX TCP/IP as well as a variety of computing component 110 specific hardware instrumentation interfaces and protocols that may be provided by component manufacturers.

In addition, management agent 220 allows IMCT 105 and computing component 110 to be remotely managed. For example, when networking agent 210 receives a control instruction from remote device 125 or NOC 120, management agent 220 will interpret the control instruction and direct application agent 215 to properly instruct computing component 110 such that the operation desired by the received control instruction is effected.

As part of the remote management functionality, it may be desirable to update operating system 205, application agent 215, networking agent 210 or management agent 220 of IMCT 105. Accordingly, IMCT 105 is preferably operable to receive software updates via communications network 115 or a similarly enabled network. In one embodiment, software updates may be initiated by IMCT 105 to enable IMCT 105 to adapt to various computing components 110, LANs 111 and 112 or other devices with which IMCT 105 may communicate.

Computing component 110 preferably includes local agent 225 residing and executing thereon. Local agent 225 is preferably configured to respond to commands received from IMCT 105 and its operating system 205 or components thereof via communications interface 140. For example, management agent 220 may receive a command from remote device 125 directing local agent 225 to return the operational status of computing component 110 or software running thereon. Upon receiving such an instruction by networking agent 210, management agent 220 may then pass a related request to application agent 215. Application agent 215 may then direct networking agent 210 to transmit the corresponding instruction to local agent 225 for processing. In a further embodiment, application agent 215 may be operable to interrogate computing component 110 and any associated hardware or software on its own and independent of local agent 225. Upon receipt, local agent 225 may then execute the one or more instructions received from IMCT 105 and interrogate the appropriate areas of computing component 110 such that the requested information is located and returned to the IMCT 105 and its management agent 220. Upon receipt, management agent 220 may then relay the requested information to networking agent 210 such that the information may be directed to remote device 125, NOC 120 or other destination via communications network 115. As such, local agent 225 is preferably operable to determine the status information of various aspects of computing component 110, cause certain tasks to be executed by computing component 110 through an operating system included thereon or otherwise, communicate information to and from management agent 220 as well as to perform other monitoring and control related tasks.

NOC 120 is preferably capable of managing and controlling IMCT 105 through the use of operations center agent 230. As such, NOC 120 may be configured with the communications software, database software, etc., necessary to effect such operation. In one embodiment, NOC 120 may be responsible for providing IMCT 105 with any desired software updates. In a further embodiment, NOC 120 may provide a web-based management application that can be used to interact remotely with the IMCTs 105 and computing components 110. Such a web-based management application would preferably be accessible by an Internet enabled computer, PDA, mobile phone, two-way pager, etc., and support such web-based protocols as HTTP, SSL and XML.

Functionality preferably included in the web-based management application might include access to a listing of alerts that have been resolved, alerts that have not been resolved, periodic reports on monitored characteristics of computing component 110, etc. In addition, the web-based management application is preferably further capable of remotely controlling computing component 110 via IMCT 105. For example, a user may want to issue a maintenance command to computing component 110 in an attempt to resolve one of the alerts that has yet to be resolved and is displayed on a provided web site (not expressly shown). Similarly, a user may want to further investigate the source of an unresolved alert by issuing a command to computing component 110 that further interrogates computing component 110 in an effort to pinpoint the source of the alert for the user. The web based management application may also allow a user to send software updates to an IMCT 105 or to instruct an IMCT 105 to communicate with another IMCT 105.

Device agent 235 may be included on remote device 125 to allow remote device 125 to better communicate with IMCT 105. Similar to NOC 120 and operations center agent 230, remote device 125 and device agent 235 are preferably capable of communicating with IMCT 105 via communications network 115. Device agent 235 may be configured to instruct IMCT 105 and the software components of software system 200 included thereon to monitor and control aspects of computing component 110 in much the same manner as that described above. Using device agent 235, or software inherent on remote device 125, a remote user may be able to respond to alerts from IMCT 105, initiate processes on computing component 110, as well as perform other management and monitoring functions on computing component 110 via communications network 115 and IMCT 105.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. An apparatus for the remote monitoring and control of a computing component using wireless technology, the apparatus comprising:
   at least one processor operably coupled to a first transceiver and a LAN transceiver;
   at least one memory operably coupled to the processor;
   a communications interface operably coupled with the processor and the memory;
   the communications interface operable to receive information from and transmit information to a computing component;
   at least one environmental sensor operably coupled to the processor;
   the environmental sensor operable to measure at least one environmental characteristic of a computing component;
   at least one intelligent management and control transceiver operably coupled to the processor and the memory;
   the intelligent management and control transceiver operable to transmit information to and receive information using radio frequency in the range of 800 MHz to 2.4 GHz;
   at least one program of instructions storable in the memory and executable by the processor; and
   the program of instructions operable to monitor at least one characteristic of the computing component and to control at least one function of the computing component by using the intelligent management and control transceiver to increase availability and minimize downtime of computing resources through real-time notification of an occurrence of a monitored event.

2. The apparatus of claim 1 further comprising:
   the LAN transceiver operably coupled to the processor; and
   the LAN transceiver operable to communicate with at least one other intelligent management and control transceiver.

3. The apparatus of claim 1 further comprising a first power supply and a back-up power supply operably coupled to at least the processor and the memory.

4. The apparatus of claim 1 further comprising the program of instructions operable to effect monitoring and control instructions communicated from a web page.

5. The apparatus of claim 1 further comprising:
   the intelligent management and control transceiver operable to communicate computing component status to a remote device; and
   the remote device operable to manage the computing component.

6. The apparatus of claim 1 further comprising a program of instructions storable in the memory and executable by the processor operable to test the computing component capability.

7. The apparatus of claim 1 further comprising the processor, the memory, the communications interface and the intelligent management and control transceiver integrated onto a computing component expansion card.

8. The apparatus of claim 1 further comprising the communications interface operable to receive information from and transmit information to at least one other computing component operably coupled to the computing component.

9. The apparatus of claim 1 further comprising the intelligent management and control transceiver operable to transmit information to and receive information from a wireless communications network.

10. The apparatus of claim 1 further comprising:
    the program of instructions operable to generate an alert upon detection of a monitored event;
    the first transceiver operable to communicate the alert to the communications network; and
    the LAN transceiver operable to communicate the alert to the communication network.

11. A system for remotely managing at least one computing component using wireless technology, a communications interface and a communications network, the system comprising:
    an intelligent transceiver operably coupled to the computing component through a communications interface and a wireless network;

the intelligent transceiver operable to generate an alert independent of the computing component's operability;

the intelligent transceiver including a processor operably coupled to a memory and a LAN transceiver operably coupled to the processor and the memory;

the LAN transceiver operable to transmit information to and receive information from a wireless network using a frequency, wherein the frequency comprises a frequency selected from a group consisting of 800 MHz band, 900 MHz band, 1.9 GHz band, 2.4 GHz band, infra-red and laser;

an operating system storable in the memory and executable by the processor;

the operating system including at least one instruction operable to communicate via the wireless network, at least one instruction operable to monitor and control at least one computing component and at least one instruction operable to enable the remote management of the at least one computing component;

a local agent storable the at least one computing component; and the local agent operable to communicate one or more characteristics of the at least one computing component.

12. The system of claim 11 further comprising:
at least one remote device operably coupled to the communications network; and
the remote device operable to transmit information to and receive information from the intelligent transceiver via the communication network.

13. The system of claim 11 further comprising the intelligent transceiver operably coupled to a plurality of computing components.

14. The system of claim 11 further comprising:
the intelligent transceiver operable to update the operating system via the network; and
the intelligent transceiver operable to communicate with one or more computing components.

15. The system of claim 11 further comprising the intelligent transceiver operable to receive information from and transmit information to another intelligent transceiver.

16. The system of claim 11 further comprising:
one or more environmental sensors operably coupled to the processor; and
each environmental sensor operable to measure at least one environmental characteristic of the intelligent transceiver.

17. The system of claim 11 further comprising:
a power supply operably coupled to the intelligent transceiver; and
the power supply operable to provide power to the intelligent transceiver in response to a power failure of the at least one computing component.

18. The system of claim 11 further comprising the operating system including at least one instruction operable to alert at least one remote device in response to detection of a monitored event using the LAN transceiver independent of the communication network's operability to generate the alert in response to the occurrence of the monitored event.

19. An intelligent management and control transceiver comprising:
a processor;
a memory operably coupled to the processor;
a communications interface operably coupled to the processor and the memory;
the communications interface operable to communicate information to and from a computing component;
a transceiver operably coupled to the processor and the memory;
the transceiver operable to communicate information to and from a wireless communications network;
the transceiver operable to receive management and control instructions generated from a web site;
a wireless LAN transceiver operably coupled to the processor and the memory;
the LAN transceiver operable to communicate with at least one remote intelligent management and control transceiver using a radio frequency;
at least one environmental sensor operably coupled to the processor and the memory;
the at least one environmental sensor operable to monitor one or more environmental characteristics of the computing component wherein the one or more environmental characteristic includes temperature;
a power supply and a back-up power supply operably coupled to at least the processor and the memory;
the power supply and the back-up power supply operable to provide power to the processor, memory, communications interface, transceiver, LAN transceiver and environmental sensors;
the intelligent management and control transceiver operable independent of the computing component;
a program of instructions storable in the memory and executable in the processor; and
the program of instructions operable to monitor and control a plurality of facets of the computing component, to generate an alert in response to detection of a monitored event and to transmit the alert via transceiver to a remote device; and
the program of instructions further operable to effect the web site generated management and control instructions.

20. The intelligent management and control transceiver of claim 19 further comprising the program of instructions operable to perform testing on one or more computing component capabilities.

21. The intelligent management and control transceiver of claim 19 further comprising the program of instructions operable to effect updates to software.

22. The intelligent management and control transceiver of claim 19 further comprising the processor, the memory, the communications interface, the transceiver, the LAN transceiver, at least one environmental sensor and the power supply integrated onto a computing component expansion card.

* * * * *